(12) United States Patent
Redekop

(10) Patent No.: US 10,588,253 B2
(45) Date of Patent: Mar. 17, 2020

(54) TILLAGE IMPLEMENT

(71) Applicant: Johan Redekop, Winkler (CA)

(72) Inventor: Johan Redekop, Winkler (CA)

( * ) Notice: Subject to any disclaimer, the term of this patent is extended or adjusted under 35 U.S.C. 154(b) by 0 days.

(21) Appl. No.: 16/210,711

(22) Filed: Dec. 5, 2018

(65) Prior Publication Data

US 2019/0380256 A1 Dec. 19, 2019

Related U.S. Application Data

(60) Provisional application No. 62/686,972, filed on Jun. 19, 2018.

(51) Int. Cl.
| | | |
|---|---|---|
| *A01B 63/32* | (2006.01) | |
| *A01B 21/08* | (2006.01) | |
| *A01B 63/00* | (2006.01) | |
| *A01B 23/04* | (2006.01) | |
| *A01B 23/06* | (2006.01) | |
| *A01B 63/24* | (2006.01) | |

(52) U.S. Cl.
CPC .............. *A01B 63/32* (2013.01); *A01B 21/08* (2013.01); *A01B 23/046* (2013.01); *A01B 23/06* (2013.01); *A01B 63/002* (2013.01); *A01B 63/24* (2013.01)

(58) Field of Classification Search
CPC ....... A01B 15/20; A01B 21/08; A01B 23/046; A01B 63/002; A01B 63/24; A01B 63/32
USPC .......................... 172/600, 603, 614, 639, 645
See application file for complete search history.

(56) References Cited

U.S. PATENT DOCUMENTS

| | | | | |
|---|---|---|---|---|
| 4,271,912 A | * | 6/1981 | Frye ..................... | A01B 21/083 172/441 |
| 4,291,770 A | * | 9/1981 | Engler ................... | A01B 13/16 172/185 |
| 5,082,064 A | * | 1/1992 | Landoll ................ | A01B 21/083 172/178 |
| 6,612,381 B2 | * | 9/2003 | Powell ................. | A01B 23/046 172/145 |
| 6,935,435 B1 | * | 8/2005 | Shenk .................... | A01B 39/14 172/582 |
| 7,000,708 B2 | * | 2/2006 | Powell ................. | A01B 23/046 172/600 |
| 9,763,378 B2 | * | 9/2017 | Redekop .............. | A01B 73/067 |
| 9,826,671 B2 | * | 11/2017 | Redekop ............... | A01B 21/08 |

(Continued)

*Primary Examiner* — Gary S Hartmann
(74) *Attorney, Agent, or Firm* — Ryan W. Dupuis; Ade & Company Inc.; Kyle R. Satterthwaite

(57) ABSTRACT

A tillage implement has a main frame towed in a forward working direction and toolbar assemblies supported on the main frame. Each assembly has an elongate toolbar member transverse to the forward working direction with tillage units spaced along the toolbar member for working the ground. A pivot supports each toolbar at an intermediate location on the toolbar for angular adjustment about an upright axis relative to the main frame. Followers at opposing ends of each toolbar member are received in respective guides at fixed locations on the main frame such that the followers are slidable within the guides in the forward working direction while restricting rotation of the toolbar member about a longitudinal axis of the toolbar member relative to the main frame. Angular position of each toolbar is controlled by an actuator with an attached mechanical indicator that can be read by an operator.

11 Claims, 9 Drawing Sheets

(56) References Cited

U.S. PATENT DOCUMENTS

2006/0124327 A1\* 6/2006 Powell ................ A01B 23/046
   172/600
2011/0220373 A1\* 9/2011 Martindale ............ A01B 41/04
   172/21

\* cited by examiner

TILLAGE IMPLEMENT

This application claims the benefit under 35 U.S.C. 119(e) of U.S. provisional application Ser. No. 62/686,972, filed Jun. 19, 2018.

FIELD OF THE INVENTION

The present invention relates to a tillage implement comprising a frame which supports a plurality of toolbar assemblies, each having coulter disk tillage units supported on a toolbar member in which the toolbar member is angularly adjustable relative to the frame about an upright axis of a pivot assembly coupled to an intermediate location along the toolbar member.

BACKGROUND

One known construction of coulter disk vertical tillage implements having toolbar devices which are angularly adjustable relative to a forward working direction comprises U.S. Pat. No. 8,746,361 by Great Plains Manufacturing, Inc. Each toolbar is supported on the implement frame for pivotal adjustment about a vertical pivot axis at an intermediate location offset towards one side of the toolbar requiring additional support for the toolbar using guide plates in sliding contact at an intermediate location along the toolbar spaced from the pivot axis. The pivot and guide plate configuration provide limited support against torsional deflection of the toolbar however.

SUMMARY OF THE INVENTION

According to one aspect of the invention there is provided a tillage implement comprising:

a main frame supported for movement across the ground in a forward working direction;

a hitch connected to the main frame and arranged for connection to a towing vehicle to displace the main frame in the forward working direction with the towing vehicle;

a plurality of toolbar assemblies supported on the main frame, each toolbar assembly comprising:

a toolbar member which is elongate in a longitudinal direction between opposing ends of the toolbar member and which is oriented transversely to the forward working direction;

a plurality of tillage units spaced along the toolbar member having respective coulter disks supported thereon for engaging and working the ground;

a pivot assembly pivotally coupling the toolbar member on the main frame such that the toolbar member is pivotal relative to the main frame about an upright pivot axis located at an intermediate location spaced inwardly from each of the opposing ends;

two followers on the toolbar member in proximity to the opposing ends of the toolbar member respectively, each follower member having an upper follower surface and a lower follower surface which are parallel and spaced apart from one another and which define a thickness of the followers; and two guides at fixed locations on the main frame for receiving the two follower members therein as the toolbar member is pivotally displaced about the upright pivot axis of the pivot assembly, each guide comprising an upper guide surface and a lower guide surface which are flat and parallel to one another and which are spaced apart from one another by a distance corresponding to the thickness of the followers such that the followers are slidable within the guides generally in the forward working direction while restricting rotation of the toolbar member about a longitudinal axis of the toolbar member relative to the main frame.

Use of a follower slidably received within a corresponding guide at both ends of a toolbar which is supported on an intermediate pivot assembly allows to toolbar member to be readily adjusted in angular orientation while providing resistance against torsional deflection of the toolbar member by the support at the opposing ends.

The pivot assembly of each toolbar assembly is preferably centrally located along a length of the toolbar member between the opposing ends thereof.

Each toolbar assembly may further comprise a linear hydraulic actuator operatively connected between the toolbar member and the main frame such that extension and retraction of the actuator varies the angular orientation of the toolbar member relative to the main frame, in which the actuator is pivotally coupled to the toolbar member at a location which is offset towards a first one of the opposing ends of the toolbar member.

Each toolbar assembly may further comprise a plurality of pin apertures on the toolbar member and the main frame so as to be adapted to receive a pin member through a cooperating pair of the pin apertures so as to selectively retain the toolbar member in fixed relation to the main frame at a prescribed angular orientation associated with the cooperating pair. The pin apertures may be located on the one of the guides and on one of the followers of each toolbar assembly.

The upright pivot axis of the pivot assembly of each toolbar assembly is preferably spaced rearwardly of the toolbar member.

The followers of each toolbar assembly may be supported on the toolbar member using threaded fasteners.

The toolbar member of each toolbar assembly preferably comprises an elongate, rigid beam spanning between the opposing ends of the toolbar member in which the upper follower surface and the lower follower surface of the followers of each toolbar assembly are wider in the forward working direction than the rigid beam of the toolbar member.

When the toolbar member of each toolbar assembly comprises an elongate, rigid beam spanning between the opposing ends of the toolbar member, the upper follower surface and the lower follower surface of the followers of each toolbar assembly may be vertically spaced from the rigid beam. Preferably the upper follower surface and the lower follower surface of the followers of each toolbar assembly are both spaced above the rigid beam of the toolbar member.

The implement may further comprises (i) a linear hydraulic actuator associated with each toolbar assembly in which the actuator is operatively connected between the toolbar member and the main frame such that extension and retraction of a piston portion relative to a cylinder portion of the actuator varies the angular orientation of the toolbar member relative to the main frame, and (ii) a gauge assembly associated with each toolbar assembly in which the gauge assembly comprises (a) a gauge panel supported on one of the piston portion or the cylinder portion of the actuator, the gauge panel having an indicator edge which lies in a common upright plane with a linear axis of the actuator at an acute slope relative to the linear axis, and (b) an indicator member supported on another one of the piston portion or the cylinder portion of the actuator, the indicator member being elongate and being oriented to extend radially outwardly from the linear axis in close proximity to the indicator edge so as to be in an intersecting relationship with the indicator edge, in which the gauge panel is positioned such that the intersection of the indicator edge varies in location along the indicator member as the actuator is extended and retracted.

According to a second aspect of the present invention there is provided a tillage implement comprising:

a main frame supported for movement across the ground in a forward working direction;

a hitch connected to the main frame and arranged for connection to a towing vehicle to displace the main frame in the forward working direction with the towing vehicle;

a toolbar member supported on the main frame which is elongate in a longitudinal direction between opposing ends and which is oriented transversely to the forward working direction;

an angular adjustment mechanism supporting the toolbar member on the main frame such that an angular orientation of the toolbar member relative to the forward working direction of the main frame is adjustable;

a plurality of tillage units spaced along the toolbar member and having respective coulter disks supported thereon for engaging and working the ground, the tillage units being movable with the toolbar member for angular adjustment relative to the main frame;

a linear hydraulic actuator operatively connected between the toolbar member and the main frame such that extension and retraction of a piston portion relative to a cylinder portion of the actuator varies the angular orientation of the toolbar member relative to the main frame; and a gauge assembly comprising:

a gauge panel supported on one of the piston portion or the cylinder portion of the actuator, the gauge panel having an indicator edge which lies in a common upright plane with a linear axis of the actuator at an acute slope relative to the linear axis; and an indicator member supported on another one of the piston portion or the cylinder portion of the actuator, the indicator member being elongate and being oriented to extend radially outwardly from the linear axis in close proximity to the indicator edge so as to be in an intersecting relationship with the indicator edge;

the gauge panel being positioned such that the intersection of the indicator edge varies in location along the indicator member as the actuator is extended and retracted.

The gauge assembly provides direct visual feedback to an operator to readily determine the angular position of the toolbars using a simple mechanism.

Preferably the indicator member is vertically oriented.

The indicator edge may be sloped upward and rearwardly at an inclination of 30-60 degrees.

The indicator edge may comprise one boundary edge of an elongate slot formed in the gauge panel.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
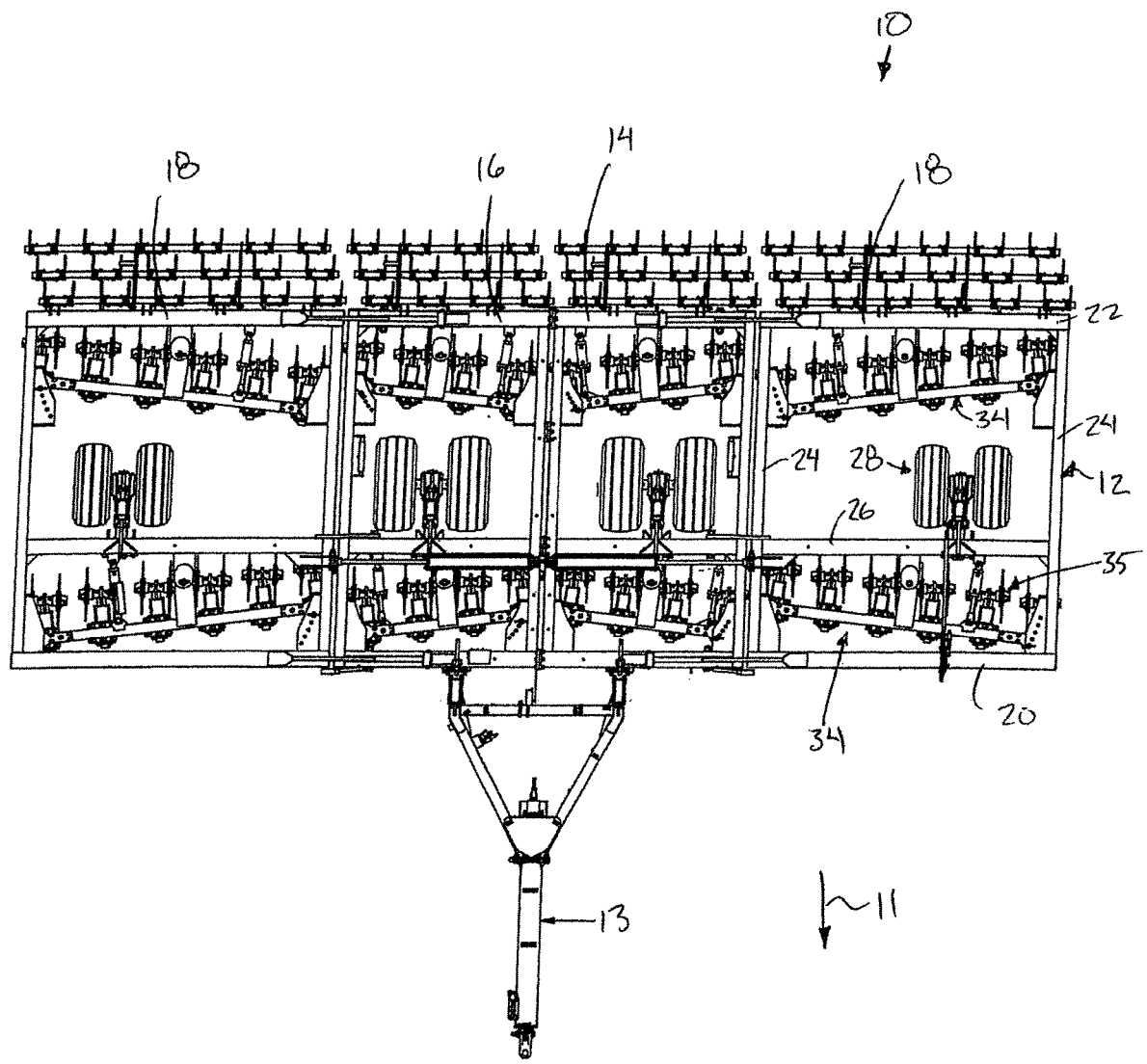
FIG. 1 is a top plan view of the tillage implement according to the present invention.
Figure 2:
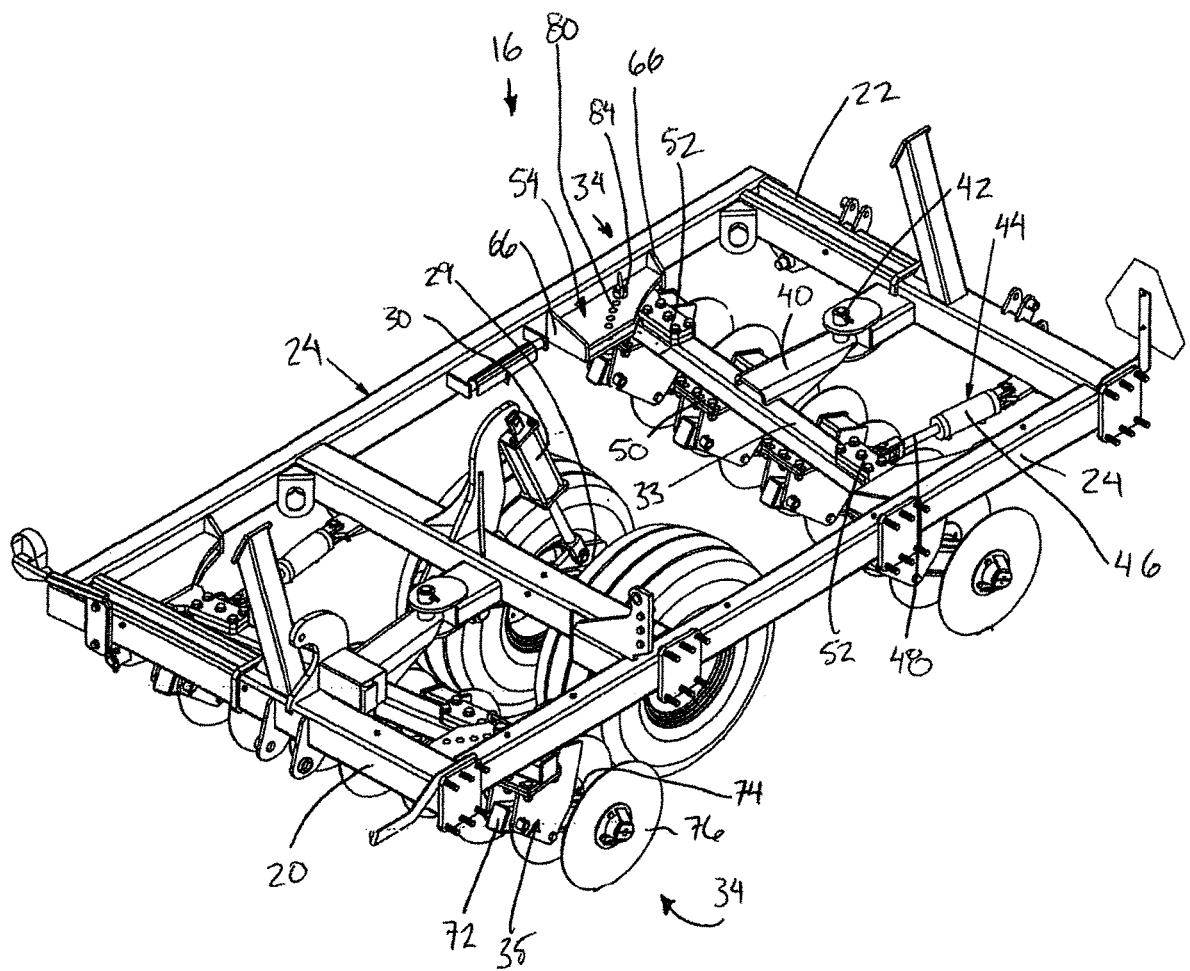
FIG. 2 is a perspective view of the right center section of the main frame of the implement of FIG. 1.
Figure 3:
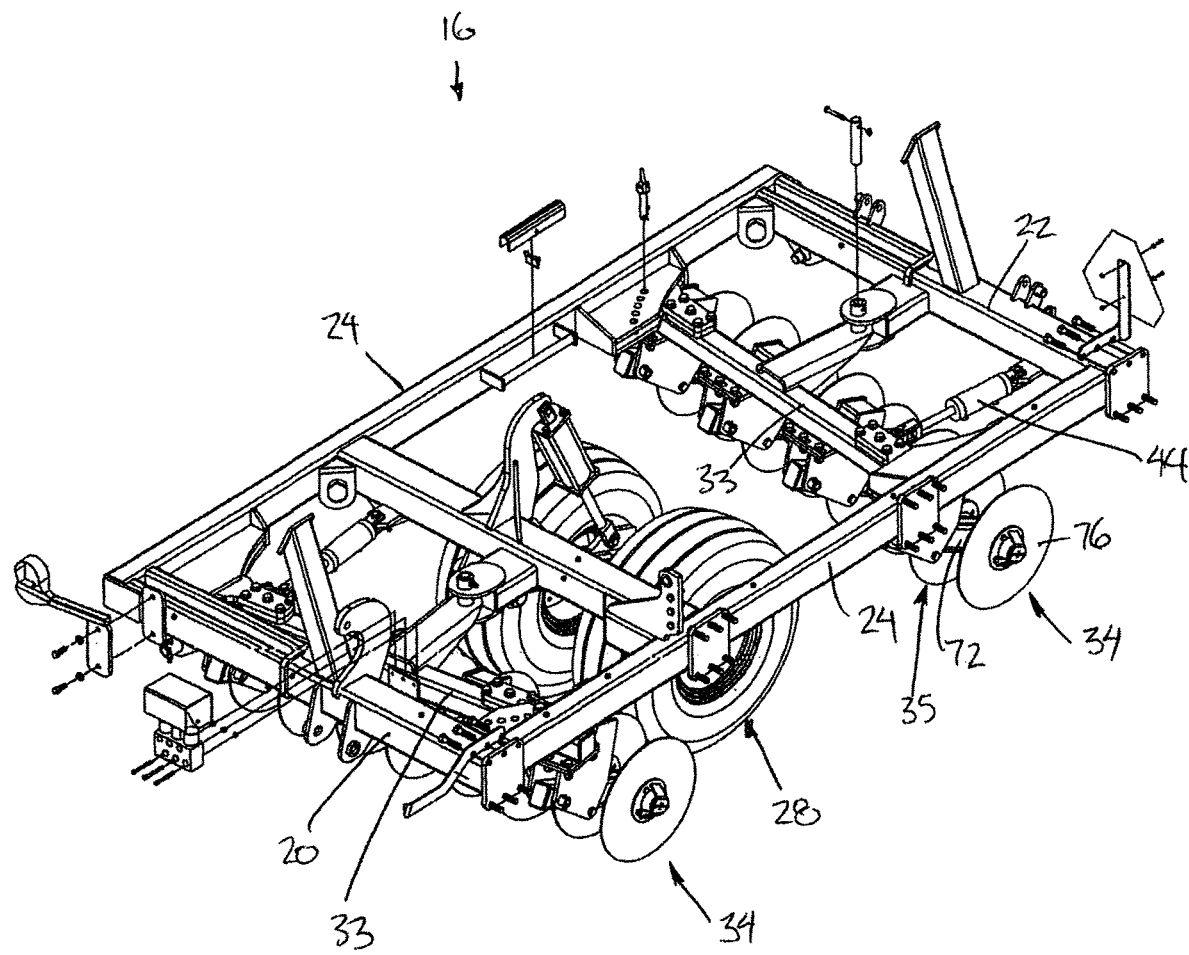
FIG. 3 is a partly exploded perspective view of the right center section of the main frame of the implement according to FIG. 2.
Figure 4:
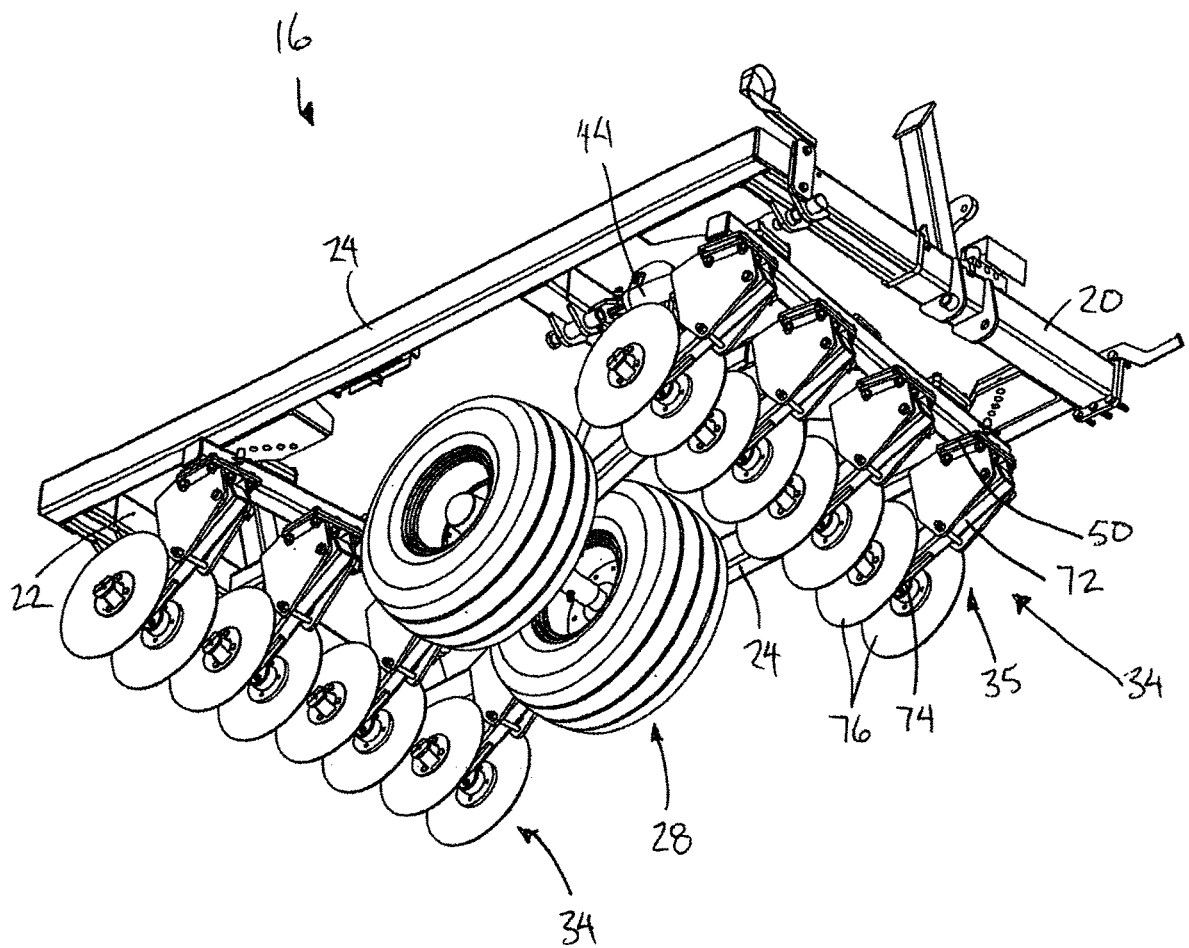
FIG. 4 is another perspective view of the right center section of the main frame of the implement showing a bottom side.
Figure 5:
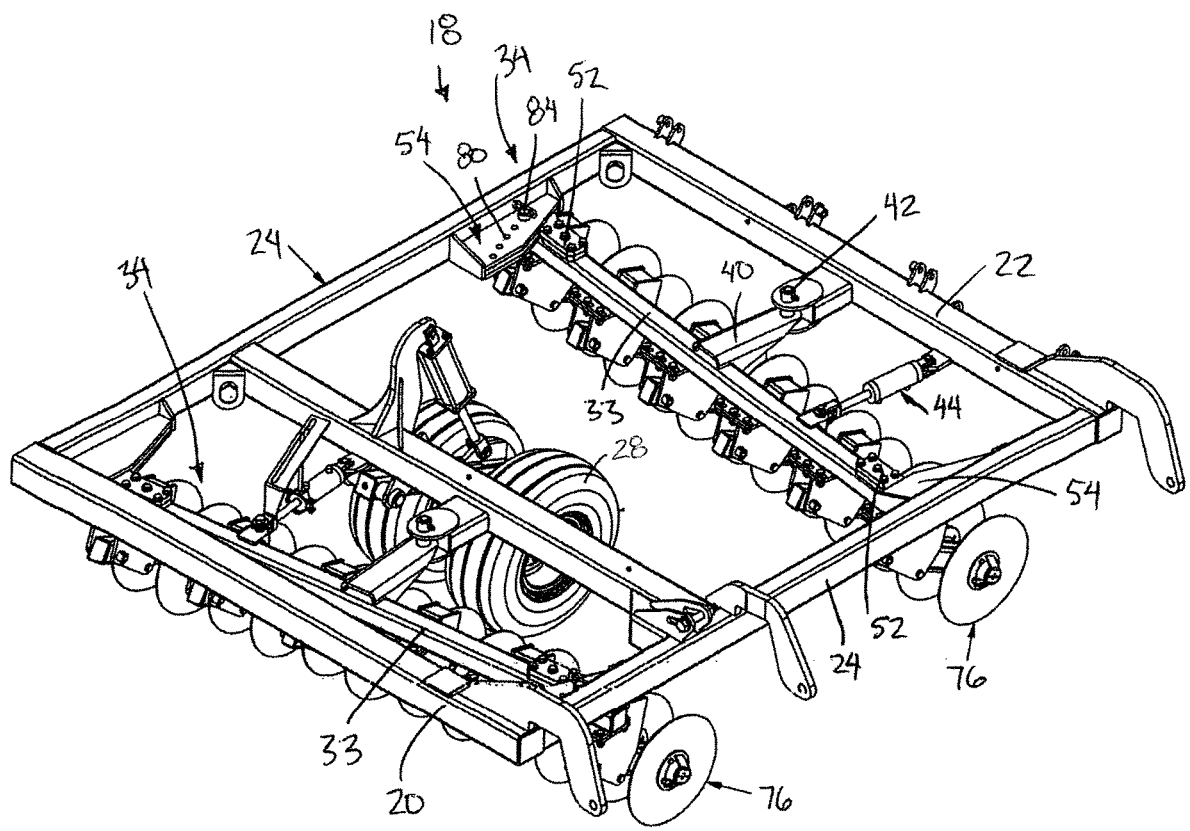
FIG. 5 is a perspective view of a right wing section of the main frame of the implement illustrating a gauge assembly supported thereon.
Figure 6:
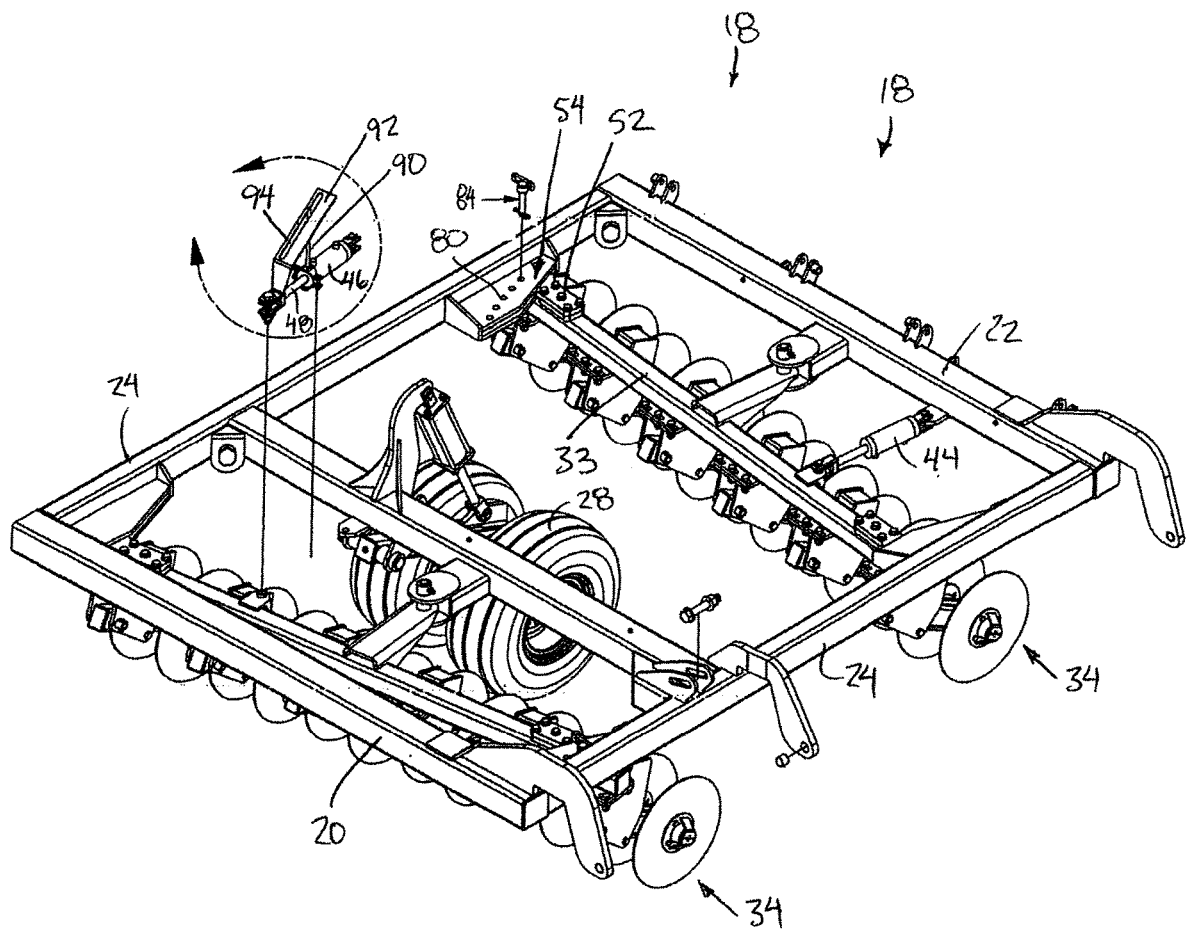
FIG. 6 is a partly exploded perspective view of the right wing section of the main frame of the implement according to FIG. 5.
Figure 7:
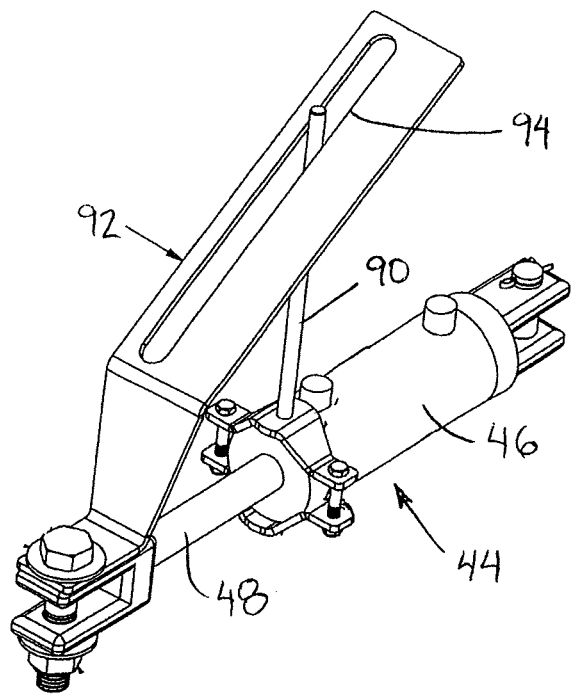
FIG. 7 is a perspective view of the gauge assembly.
Figure 8:
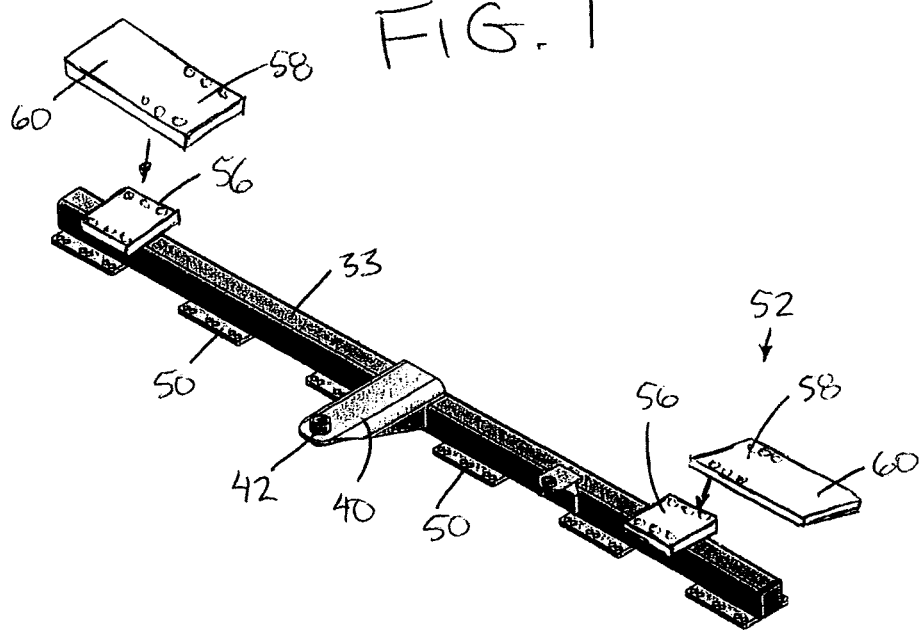
FIG. 8 is a perspective view of one of the toolbar members.
Figure 9:
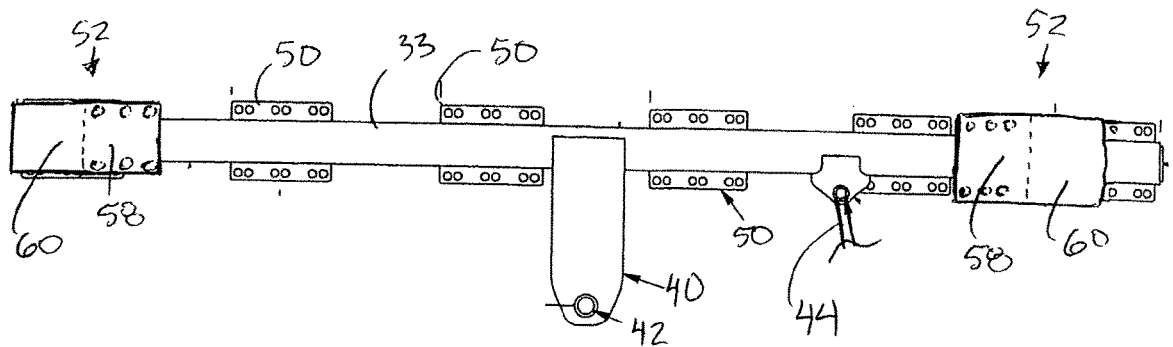
FIG. 9 is a top plan view of the toolbar member of FIG. 8.
Figure 10:
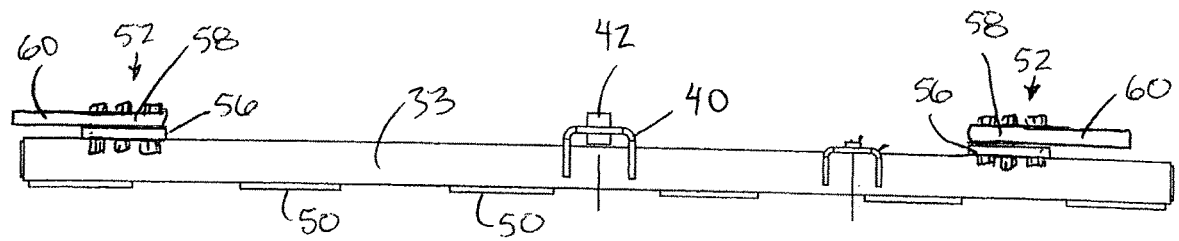
FIG. 10 is a front elevational view of the toolbar member of FIG. 8.
Figure 11:
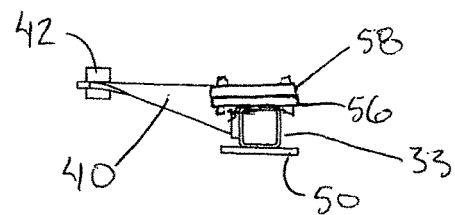
FIG. 11 is an end elevational view of the toolbar member of FIG. 8.
Figure 12:
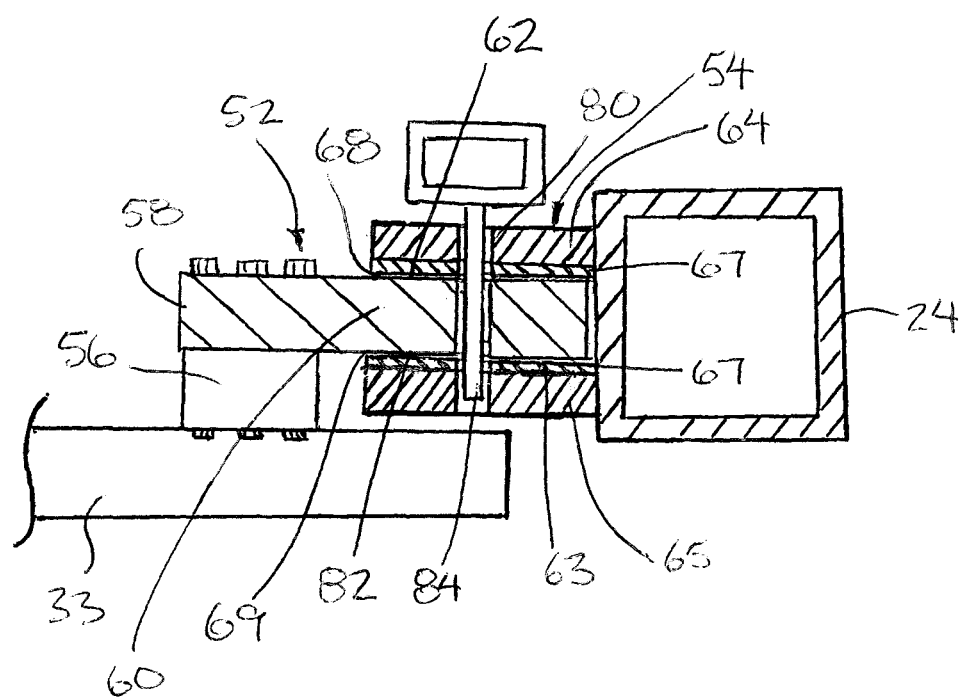
FIG. 12 is a sectional view of the one of the followers received within the respective guide on the main frame.

Referring to the accompanying figures, there is illustrated a tillage implement generally indicated by reference numeral 10. The implement 10 is suited for being towed by a tractor in a forward working direction 11 for working the ground, for example as in vertical tillage.

The implement includes a main frame 12 having a hitch portion 13 protruding forwardly from the frame for connection to a towing vehicle such as an agricultural tractor to displace the main frame in the forward working direction with the towing vehicle.

The main frame 12 includes a center section comprised of a left center section 14 and a right center section 16 joined so as to be fixed to one another. The frame also includes two wing sections 18 coupled along opposing sides of the center section so as to be coupled to the left and right center sections respectively. Each wing section 18 is pivotal relative to the respective one of the center sections about a respective fold axis oriented generally in the forward working direction.

Each of the left section, the right section and the two wing sections 18 comprises a front beam 20 perpendicular to the forward direction, a rear beam 22 spaced rearward of the front beam and two side beams 24 extending in the forward direction along opposing sides of the section between the rear beam and the front beam, such that the frame members of each section are in a rectangular configuration lying generally in a horizontal plane. Each section further comprises an intermediate beam 26 spanning between the two side beams parallel to the front and rear beam at an intermediate location spaced from both the front and rear beams.

In a field working position all of the frame members of the sections lie in a generally common horizontal plane with the front beams aligned with one another to form a common front end of the main frame while the rear beams are similarly all aligned along the rear end of the main frame. For transport, the two wing sections are folded upwardly and inwardly overtop the left and right sections of the center section respectively into a folded transport position.

Each of the left, right and two wing sections further comprises at least one wheel assembly 28 supported on the intermediate beam thereof. Each wheel assembly includes a leg 29 pivotal about a horizontal axis in a lateral direction oriented perpendicularly to the forward working direction. Each leg is pivoted at a forward upper end to the respective intermediate beam to extend generally downward and rearward to a bottom end. The bottom ends of the legs support respective wheels thereon for rolling movement in the forward working direction.

A hydraulic actuator 30 is associated with each wheel assembly and is connected between the leg 29 and the intermediate beam such that extension and retraction of the hydraulic actuator causes the wheels of the wheel assembly to be raised and lowered relative to the frame sections. By raising the wheels relative to the frame, the frame can be towed across the field in a working configuration so that the tillage tools carried on the implement engage the ground for working the ground. Alternatively, by lowering the wheels relative to the frame, the frame is raised so that the tillage tools are spaced above the ground and the frame is carried solely on the wheels of the wheel assemblies for transport in a transport position. The wheels of the center sections remain lowered for supporting the implement thereon in the transport position when the wings are folded up.

Each of the sections of the main frame supports a plurality of toolbar assemblies 34 thereon. Each toolbar assembly comprises a rigid tubular beam defining a toolbar member 33 of generally rectangular cross section which supports a plurality of tillage units 35 at spaced positions therealong. Each of the left section 14, the right section 16, and the two wing sections 18 support one toolbar assembly adjacent the forward end thereof and one toolbar assembly adjacent the rearward end thereof with an equal number of tillage units on the front and rear toolbar assemblies within each section of the main frame. The toolbar member of each toolbar assembly is angularly adjustable relative to the forward working direction by arranging the toolbar members for pivotal movement relative to respective upright axes as described in further detail below.

Each tillage unit comprises a trailing arm 72 extending generally downward and rearward at an inclination to extend outwardly towards a trailing end 74. A downward biasing force provided by a spring member defining a biasing member biases the trailing arm downward into a working position while allowing the trailing arm to be pivoted upwardly at the rear end thereof against the force of the spring into a deflected position.

Each tillage unit supports two coulter disks 76 at the trailing end of the trailing arm such that the disks are arranged for tilling engagement with ground. The disks are rotatably supported on the trailing end of the trailing arm for rotation about a substantially horizontal disk axis oriented perpendicularly to the longitudinal direction of the arm and parallel to the respective toolbar member.

Due to the trailing configuration of the disks 76 relative to the respective toolbars upon which they are supported, the angular adjustment of the toolbar members relative to the main frame affects the lateral position of the disks 76 relative to the frame while changing the angular orientation of the disks relative to the forward working direction.

In addition to comprising a tubular rigid beam defining each toolbar member 33, each toolbar assembly further includes a support arm 40 fixed at a central location along the toolbar member 33 to extend generally rearward and perpendicularly to the longitudinal direction of the toolbar member. The support arm 40 is in turn pivotally coupled by a suitable pivot assembly 42 having a vertical pivot shaft pivotally retained in fixed location on the main frame. In this manner each toolbar member 33 is pivotal relative to the main frame about a respective upright axis of the pivot assembly which is spaced rearwardly from the toolbar member. The toolbar member is pivotal, for example through a range of approximately 15°, in either direction from a neutral position that is perpendicular to the forward working direction. In the instance of the rear toolbar assembly on each section of the main frame, the pivot assembly is supported on the rear beam, whereas the pivot assembly of each front toolbar assembly is pivotally supported on the intermediate beam of the respective frame.

Pivotal movement of each toolbar member through the range of angular orientations thereof relative to the forward working direction of the main frame is controlled by a respective linear hydraulic actuator 44 associated with each toolbar assembly. Each actuator 44 includes a cylinder portion 46 which is pivotally coupled onto the same beam as the respective pivot assembly of the associated toolbar member so as to extend forwardly to a piston portion 48 at the forward end of the actuator which is pivotally coupled to the toolbar at a location offset laterally along the toolbar member towards one side of the centrally located pivot assembly. In this manner, extension and retraction of the actuator 44 causes the toolbar member to be angularly displaced through a range of angular orientations offset in either direction from the neutral position that is perpendicular to the forward working direction.

Each toolbar member further includes a plurality of support plates 50 mounted at longitudinally spaced positions along the bottom side of the toolbar member. The support plates are welded flat against the bottom of the rectangular cross-section of the toolbar member while being wider between front and rear edges thereof than the toolbar member so as to protrude beyond the front and rear sides of the toolbar member. Suitable mounting apertures in each support plate allow use of threaded fasteners for securing the tillage units to the support plates respectively.

Each toolbar is supported against torsional deflection by providing each toolbar assembly with two followers 52 mounted on opposing ends of each toolbar member, and two guides 54 mounted on the frame for cooperation with the two followers respectively. Each follower is supported on the toolbar by a suitable mounting plate 56 which is welded flat against the top side of the rectangular beam forming the toolbar member adjacent one of the respective ends of the toolbar member. Similarly to the support plates 50, the mounting plates are wider between front and back edges than the tubular beam forming the toolbar member so that the mounting plate protrudes beyond the front and rear sides of the toolbar member.

Each follower 52 is formed of flat plate metal having a mounting portion 58 with dimensions corresponding approximately to the lateral and longitudinal dimensions of the corresponding mounting plate 56 and a cantilevered portion 60 protruding outward in the longitudinal direction of the beam forming the toolbar member beyond the outer edge of the mounting plate 56 towards the corresponding end of the toolbar member therebelow. Cooperating apertures in the mounting portion 58 of the follower in the mounting plate 56 permit threaded fasteners at front and rear sides of the toolbar member to rigidly secure the follower in fixed relation to the toolbar member. The follower defines flat upper and lower follower surfaces 62 and 63 at opposing top and bottom sides of the cantilevered portion 60 of the follower. The cantilevered portion is similarly wider than the beam such that the upper and lower follower surfaces also protrude forwardly and rearwardly beyond the respective front and rear sides of the toolbar member. The outer end of the follower terminates at or adjacent to the corresponding end of the toolbar member.

Each guide 54 comprises upper and lower plates 64 and 65 formed of flat rigid plate material mounted in a horizontal orientation so as to be parallel and spaced apart from one another to receive the cantilevered portion of a respective one of the followers therebetween. The upper and lower plates of each guide are mounted on a respective side beam of the respective frame section to be additionally supported by end plates 66 spanning vertically and perpendicularly to the forward working direction at opposing front and rear ends of the upper and lower plates. The end plates 66 are joined between the upper and lower plates 64 and 65 and span the full height of the side beam 24 upon which they are supported to act as gussets providing structural support to the upper and lower plates.

Inner surfaces of the upper and lower plates 64 and 65 are each lined with a liner plate 67 formed of a rigid material having a low coefficient of friction, for example a hard plastic material such that the liner plates define upper and lower guide surfaces 68 and 69 of the respective guide which are flat, continuous, parallel to one another, and spaced apart from one another by an interior dimension corresponding approximately to the exterior dimension between the upper and lower follower surfaces 62 and 63 of the respective follower received therein.

The distance in the forward working direction between the end plates 66 defines the range of sliding movement of each follower within the respective guide in the forward working direction so that the end plates function as stops which allow a full range of pivotal movement of the toolbar relative to the main frame as the follower is displaced between the rear end plate and the forward end plate of the respective guide while restricting pivotal movement of the toolbar member beyond the permissible range of angular adjustment relative to the main frame.

By mounting the followers with suitable mounting plate 56 functioning as spacers on the top side of the toolbar members, the resulting follower surfaces and guide surfaces are all supported at a location spaced above the top side of the beam forming the respective toolbar member.

A row of apertures 80 is provided within the upper and lower plates 64 and 65 of one guide 54 at one end of each toolbar member of each toolbar assembly for cooperation with a corresponding aperture 82 in the cantilevered portion of the follower received within that guide. The aperture in the follower plate aligns with respective ones of the apertures in the row of apertures 80 in the guide plates at each one of a plurality of different angular orientations of the toolbar relative to the main frame. In this manner a suitable retainer pin 84 can be inserted through the aligned and cooperating pair of apertures at each one of the different angular orientations of the toolbar within the range of angular orientations. The insertion of a retainer pin 84 ensures that the toolbar is remain fixed at a selected angular orientation even in the event of a failure of the hydraulics connected to the actuators 44. Locking the hydraulic actuators hydraulically however is normally sufficient to retain the toolbar members at a selected angular orientation without relying on pins 84 to fix the toolbar relative to the main frame in the event that the operator is expecting to make frequent changes to the angular orientation of the toolbar relative to the main frame.

All of the actuators 44 are links hydraulically so that the angular orientations of all toolbars move simultaneously and cooperatively relative to the main frame.

In order to provide visual feedback to the operator in the towing vehicle of the angular orientation of the toolbar members relative to the main frame, a suitable gauge assembly is operatively connected to one of the actuators 44 of the implement.

The gauge assembly includes an indicator member 90 in the form of an elongate rigid rod or bar which extends upwardly from the inner end of the cylinder portion 46 of the actuator such that the indicator member is oriented radially and perpendicularly to the linear operating axis of the actuator as well as perpendicularly to the forward working direction of the implement. The indicator member 90 cooperates with a gauge panel 92 comprising a flat panel of sheet metal material which is mounted at a bottom end at the forward end of the piston portion 48 of the actuator. The gauge panel is sloped upwardly and rearwardly over top of the inner end of the cylinder portion supporting the bottom end of the indicator member 90 thereon. More particularly the gate panel includes an elongate slot 94 formed therein which defines an indicator edge along the full length of one side of the slot 94 which lies approximately in a vertical plane of the actuator axis at a 45° upward and rearward slope relative to the actuator axis.

The length of the indicator edge and of the indicator member are suitable so that the longitudinal direction of the indicator member 90 and the indicator edge of the slot 94 lie in close proximity to one another in transverse or intersecting relationship through the full range of movement of the actuator between extended and retracted positions thereof corresponding to the full range of angular adjustment of the toolbar member relative to the main frame between offset positions on either side of the neutral position. Suitable scale markings may be provided along either one of the indicator edge of the gate panel 92 or the indicator member 90 such that visually identifying the intersection location between the indicator member 90 and the indicator edge along the scale indicates the angular position within the overall range of angular positions of the toolbar members relative to the main frame.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A tillage implement comprising:
a main frame supported for movement across the ground in a forward working direction;
a hitch connected to the main frame and arranged for connection to a towing vehicle to displace the main frame in the forward working direction with the towing vehicle;
a plurality of toolbar assemblies supported on the main frame, each toolbar assembly comprising:
a toolbar member which is elongate in a longitudinal direction between opposing ends of the toolbar member and which is oriented transversely to the forward working direction;
a plurality of tillage units spaced along the toolbar member having respective coulter disks supported thereon for engaging and working the ground;
a pivot assembly pivotally coupling the toolbar member on the main frame such that the toolbar member is pivotal relative to the main frame about an upright pivot axis located at an intermediate location spaced inwardly from each of the opposing ends;

two followers on the toolbar member in proximity to the opposing ends of the toolbar member respectively, each follower member having an upper follower surface and a lower follower surface which are parallel and spaced apart from one another and which define a thickness of the followers; and two guides at fixed locations on the main frame for receiving the two follower members therein as the toolbar member is pivotally displaced about the upright pivot axis of the pivot assembly, each guide comprising an upper guide surface and a lower guide surface which are flat and parallel to one another and which are spaced apart from one another by a distance corresponding to the thickness of the followers such that the followers are slidable within the guides generally in the forward working direction while restricting rotation of the toolbar member about a longitudinal axis of the toolbar member relative to the main frame.

2. The implement according to claim 1 wherein the pivot assembly of each toolbar assembly is centrally located along a length of the toolbar member between the opposing ends thereof.

3. The implement according to claim 2 wherein each toolbar assembly further comprises a linear hydraulic actuator operatively connected between the toolbar member and the main frame such that extension and retraction of the actuator varies the angular orientation of the toolbar member relative to the main frame, the actuator being pivotally coupled to the toolbar member at a location which is offset towards a first one of the opposing ends of the toolbar member.

4. The implement according to claim 1 wherein each toolbar assembly comprises a plurality of pin apertures on the toolbar member and the main frame so as to be adapted to receive a pin member through a cooperating pair of the pin apertures so as to selectively retain the toolbar member in fixed relation to the main frame at a prescribed angular orientation associated with the cooperating pair.

5. The implement according to claim 4 wherein the pin apertures are located on the one of the guides and on one of the followers of each toolbar assembly.

6. The implement according to claim 1 wherein the upright pivot axis of the pivot assembly of each toolbar assembly is spaced rearwardly of the toolbar member.

7. The implement according to claim 1 wherein the followers of each toolbar assembly are supported on the toolbar member using threaded fasteners.

8. The implement according to claim 1 wherein the toolbar member of each toolbar assembly comprises an elongate, rigid beam spanning between the opposing ends of the toolbar member and wherein the upper follower surface and the lower follower surface of the followers of each toolbar assembly are wider in the forward working direction than the rigid beam of the toolbar member.

9. The implement according to claim 1 wherein the toolbar member of each toolbar assembly comprises an elongate, rigid beam spanning between the opposing ends of the toolbar member and wherein the upper follower surface and the lower follower surface of the followers of each toolbar assembly are vertically spaced from the rigid beam.

10. The implement according to claim 9 wherein the upper follower surface and the lower follower surface of the followers of each toolbar assembly are both spaced above the rigid beam of the toolbar member.

11. The implement according to claim 1 further comprising:

a linear hydraulic actuator associated with each toolbar assembly in which the actuator is operatively connected between the toolbar member and the main frame such that extension and retraction of a piston portion relative to a cylinder portion of the actuator varies the angular orientation of the toolbar member relative to the main frame; and a gauge assembly associated with each toolbar assembly in which the gauge assembly comprises:

a gauge panel supported on one of the piston portion or the cylinder portion of the actuator, the gauge panel having an indicator edge which lies in a common upright plane with a linear axis of the actuator at an acute slope relative to the linear axis; and an indicator member supported on another one of the piston portion or the cylinder portion of the actuator, the indicator member being elongate and being oriented to extend radially outwardly from the linear axis in close proximity to the indicator edge so as to be in an intersecting relationship with the indicator edge;

the gauge panel being positioned such that the intersection of the indicator edge varies in location along the indicator member as the actuator is extended and retracted.

* * * * *